United States Patent [19]

Ohtsuka et al.

[11] Patent Number: 5,260,843
[45] Date of Patent: Nov. 9, 1993

[54] MAGNETIC RECORDING AND REPRODUCING APPARATUS WITH INDIVIDUAL CORRECTION OF AMPLITUDE VARIATIONS OF RECORDING CURRENTS SUPPLIED TO PLURAL ROTARY MAGNETIC HEADS

[75] Inventors: Susumu Ohtsuka; Tomishige Yatsugi; Yoshitaka Okada, all of Katsuta, Japan

[73] Assignee: Hitachi, Ltd., Tokyo, Japan

[21] Appl. No.: 651,516

[22] Filed: Feb. 6, 1991

[30] Foreign Application Priority Data

Feb. 6, 1990 [JP] Japan .................. 2-025140

[51] Int. Cl.⁵ .................. G11B 15/14; H04N 9/79
[52] U.S. Cl. .................. 360/64; 358/315
[58] Field of Search .................. 360/46, 64, 65, 61; 358/315, 316, 318, 310

[56] References Cited

U.S. PATENT DOCUMENTS

| | | | |
|---|---|---|---|
| 3,265,818 | 8/1966 | Goossen et al. | 179/100.2 |
| 3,732,361 | 5/1973 | Makara | 178/5.4 CD |
| 3,852,808 | 12/1974 | Sadashige | 358/8 |
| 4,433,255 | 2/1984 | Taguchi et al. | 307/353 |
| 4,549,229 | 10/1985 | Nakano et al. | 360/64 |
| 4,700,239 | 10/1987 | Yoshinaka et al. | 358/310 |
| 4,713,700 | 12/1987 | Kawahara et al. | 358/315 |
| 4,757,392 | 7/1988 | Awamoto et al. | 358/340 |

OTHER PUBLICATIONS

*Patent Abstracts of Japan*, vol. 11, No. 110 (E-496), Apr. 7, 1987 (for Japanese Kokai 61-256890).

*Primary Examiner*—Donald T. Hajec
*Assistant Examiner*—Won Tae C. Kim
*Attorney, Agent, or Firm*—Antonelli, Terry, Stout & Kraus

[57] ABSTRACT

In a magnetic recording and reproducing apparatus, amplitude errors of recording currents respectively supplied to a plurality of rotary magnetic heads are detected, and, in individual periods of sequential scanning of a magnetic recording medium by the plural rotary magnetic heads, the gain of a variable gain amplifier disposed in a signal recording system sequentially supplying an input video signal to the plural rotary magnetic heads is controlled so as to automatically adjust the value of the recording current supplied to each of the rotary magnetic heads.

6 Claims, 4 Drawing Sheets

MAGNETIC RECORDING AND REPRODUCING APPARATUS WITH INDIVIDUAL CORRECTION OF AMPLITUDE VARIATIONS OF RECORDING CURRENTS SUPPLIED TO PLURAL ROTARY MAGNETIC HEADS

BACKGROUND OF THE INVENTION

This invention relates to a magnetic recording and reproducing apparatus such as a video tape recorder of helical scan type in which a plurality of rotary magnetic heads are used to sequentially record an input signal on a magnetic recording medium such as a magnetic tape.

FIG. 3 shows a signal recording system incorporated in a prior art magnetic recording and reproducing apparatus of this type, for example, a VHS system VTR.

Referring to FIG. 3, an input video signal a is passed through a low-pass filter (abbreviated hereinafter as an LPF) 1 and a band-pass filter (abbreviated hereinafter as a BPF) 2 to be separated into a luminance signal b and a color signal c respectively. After the luminance signal b is subjected to frequency modulation in an FM modulation circuit 3, and the color signal C is converted into a down converted chrominance signal in a down conversion circuit 6, these signals b and c are passed through level adjusters 4 and 7 respectively and then mixed together in a mixer circuit 5. The mixture of the FM luminance signal and the down converted chrominance signal is applied to a recording amplifier circuit 8 to be suitably amplified, and the output signal of the recording amplifier circuit 8 is applied to a pair of rotary magnetic heads 9 and 10 through a rotary transformer 11 to be alternately recorded on respective video tracks on a magnetic recording medium (not shown). Resistors 13 and 14 are connected in series with the primary windings of the respective channels in the rotary transformer 11, and a monitor output for controlling the level adjusters 4 and 7 is derived from a terminal 12 connected to the resistor 13.

The recording and reproducing characteristic of a magnetic recording and reproducing apparatus of this kind is described, for example, at page 49 of a book entitled "VTR" written and edited by Kenichi Sawazaki and published by the Corona Publishing Co. in Japan in October, 1971. FIG. 4 shows the recording and reproducing characteristic described in the above book. It will be apparent from FIG. 4 that the level of a reproduced output changes according to the level of a recording current supplied to magnetic heads.

Therefore, in the prior art magnetic recording and reproducing apparatus shown in FIG. 3, the recording current levels of the FM luminance signal and the down converted chrominance signal are adjusted by the respective level adjusters 4 and 7 while monitoring the values of the recording currents actually supplied to the rotary magnetic heads 9 and 10 by observing the monitor output derived from the terminal 12. Thus, the recording current levels of the FM luminance signal and the down converted chrominance signal can be adjusted so as to be optimized regardless of fluctuation of the gains of the FM modulation circuit 3, down conversion circuit 6, mixer circuit 5 and recording amplifier circuit 8 and also regardless of fluctuation of the level of the input video signal a itself. The optimum value of the recording current of the FM luminance signal is such that the level of the reproduced output becomes maximum so as to provide a sufficient S/N ratio. However, as will be apparent from FIG. 4, this optimum value differs depending on the frequency of the recording signal. Therefore, it is a common practice that the optimum value is so selected as to provide a maximum reproduced output level with respect to the center frequency (3 to 4 MHz) of the carrier. In the case of the down converted chrominance signal, a problem, for example, diamond cross beat interference due to cross modulation with the FM luminance signal arises when the level adjuster 7 adjusts the level of the low frequency band color signal so as to maximize the reproduced output level. Therefore, the level of the low frequency band color signal is commonly adjusted to be lower by 10 dB or less than that of the FM luminance signal.

In the prior art magnetic recording and reproducing apparatus described above, the level adjusters 4 and 7 must be manually adjusted while observing the monitor output derived through the terminal 12. Thus, the adjustment is troublesome and time consuming. Also, because variable resistors are required as these level adjusters 4 and 7, the entire recording circuit cannot be integrated into an IC, and an increase in the costs of the circuit parts is inevitable. Further, the fact that these variable resistors are incorporated as externally mounted parts leads to the problem that the manufacturing process becomes correspondingly complex.

Further, because the recording current levels are adjusted in the recording circuit system common to the two rotary magnetic heads 9 and 10, the values of the recording currents supplied to these rotary magnetic heads 9 and 10 cannot be adjusted independently of each other. In the case of the prior art apparatus shown in FIG. 3, the value of the recording current supplied to the rotary magnetic head 9 only (the voltage drop across the resistor 13 only) is monitored so as to adjust the level adjusters 4 and 7. Therefore, such a problem arises that the value of the recording current supplied to the other rotary magnetic head 10 is not necessarily adjusted to its optimum value due to, for example, a difference between the inductances of the rotary magnetic heads 9 and 10.

SUMMARY OF THE INVENTION

With a view to solve such a prior art problem, it is an object of the present invention to provide a magnetic recording and reproducing apparatus in which the values of recording currents supplied to respective rotary magnetic heads can be independently and automatically controlled without resorting to the manual control by variable resistors.

The present invention which attains the above object provides a magnetic recording and reproducing apparatus comprising variable gain amplifier means for variably controlling the amplitude of recording currents respectively supplied to a plurality of rotary magnetic heads recording an input signal on a magnetic recording medium, and control means for sequentially variably controlling the gain of the variable gain amplifier means by detecting amplitude errors of the recording currents supplied to the respective rotary magnetic heads in individual scanning periods in which the respective rotary magnetic heads sequentially and alternately scan the magnetic recording meidum.

By the provision of the variable gain amplifier means and the control means described above, the values of the recording currents supplied to the respective rotary magnetic heads can be independently and automatically controlled without resorting to the prior art manual control by means of level adjusters.

DESCRIPTION OF THE PREFERRED EMBODIMENTS

Preferred embodiments of the present invention will now be described in detail with reference to the drawings.

Figure 1:
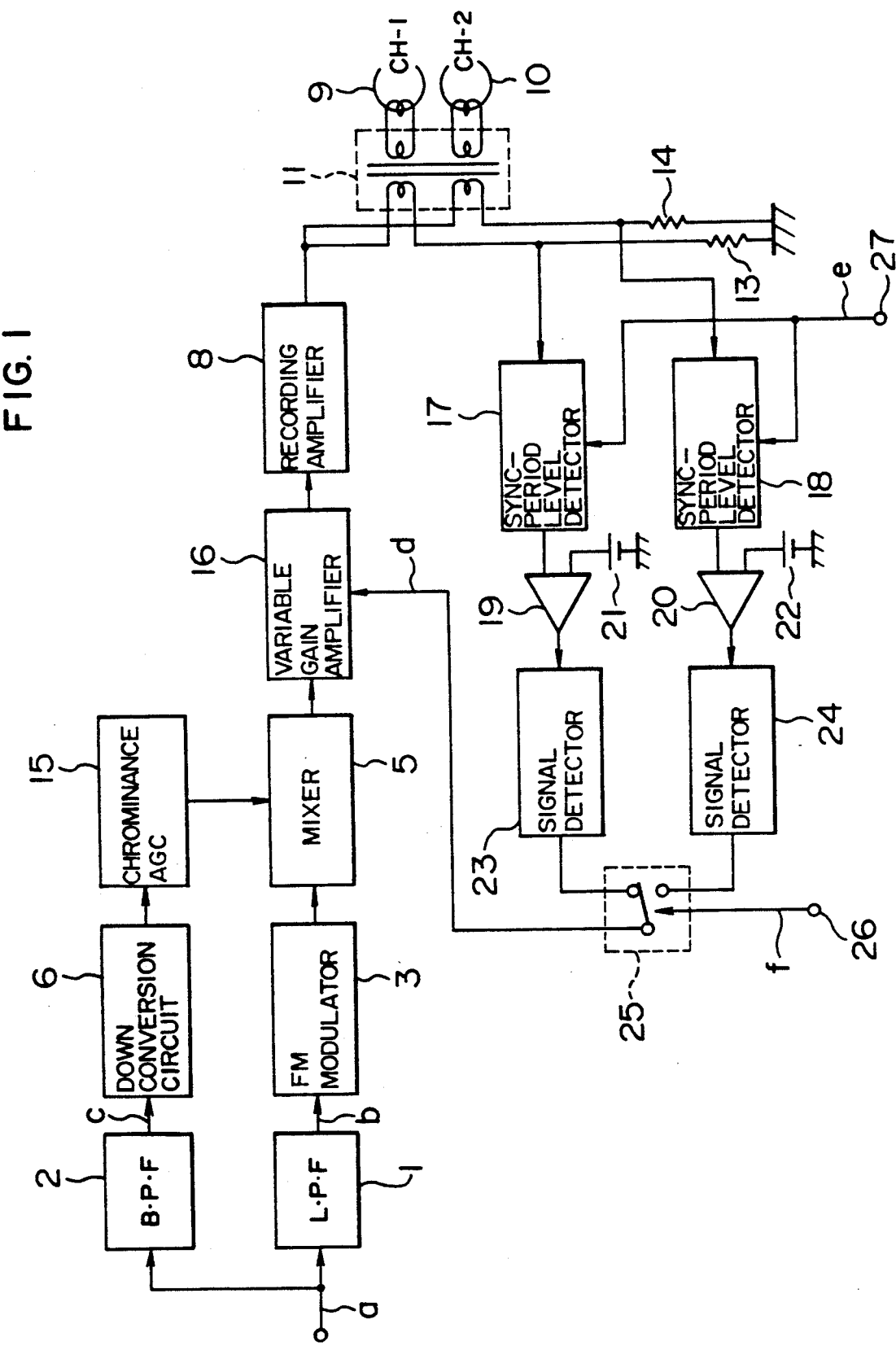
FIG. 1 is a block circuit diagram showing the structure of an embodiment of the magnetic recording and reproducing apparatus according to the present invention.
Figure 3:
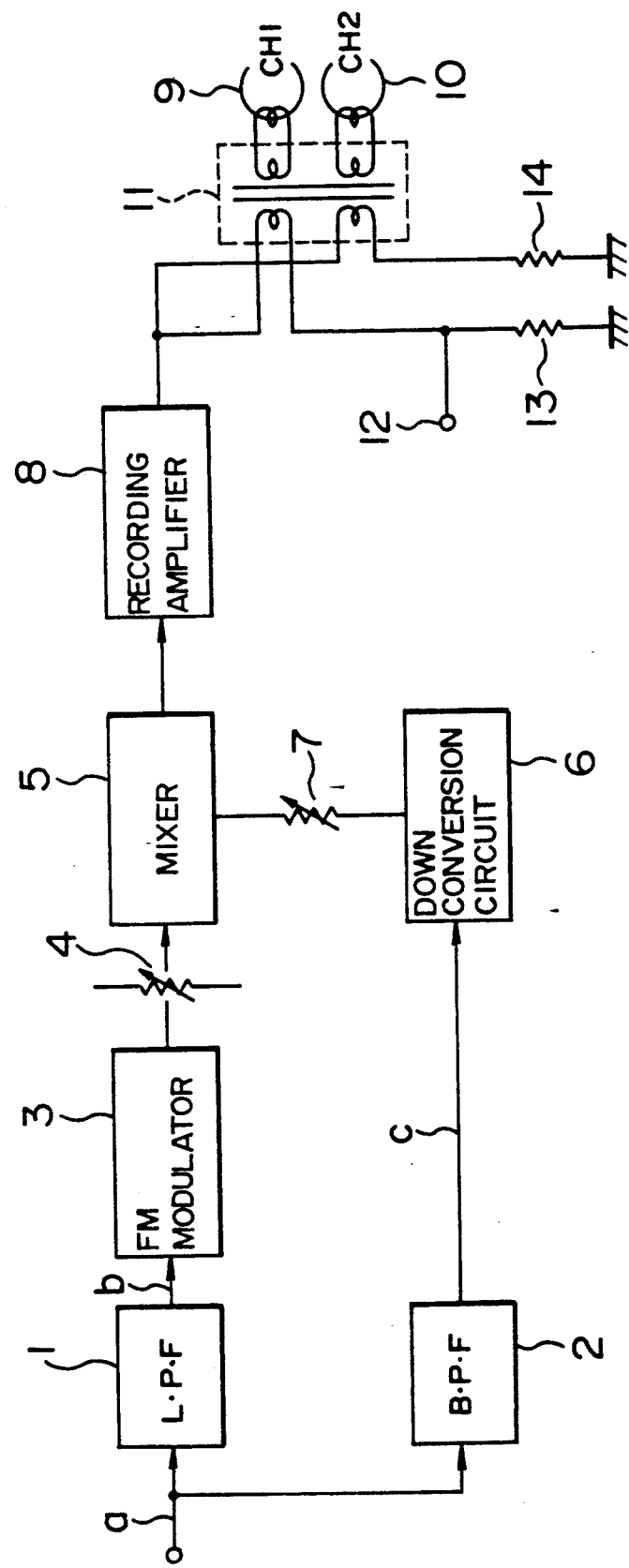
FIG. 3 is a block circuit diagram showing the structure of a prior art magnetic recording and reproducing apparatus.

FIG. 1 shows the structure of an embodiment of the magnetic recording and reproducing apparatus according to the present invention. In FIG. 1, like reference numerals are used to designate like parts appearing in FIG. 3. The magnetic recording and reproducing apparatus shown in FIG. 1 comprises an LPF 1, a BPF 2, an FM modulation circuit 3, a mixer circuit 5, a down conversion circuit 6, a recording amplifier circuit 8, a pair of rotary magnetic heads 9, 10, a rotary transformer 11, resistors 13, 14, a chrominance AGC circuit 15, a variable gain amplifier circuit 16, synchronizing signal period level detector circuits 17, 18, comparator circuits 19, 20, reference voltage sources 21, 22, signal detector circuits 23, 24, a switching circuit 25, and input terminals 26, 27.

Referring to FIG. 1 a luminance signal b separated from an input video signal a by the LPF 1 is applied to the mixer circuit 5 after being subjected to frequency modulation in the FM modulation circuit 3. On the other hand, a color signal c separated from the input video signal a by the BPF 2 is applied to the chrominance AGC circuit 15 after being converted into a down converted chrominance signal by the down conversion circuit 6. This chrominance AGC circuit 15 is provided so that the level of the down converted chrominance signal is maintained at a constant level lower by 10 dB or less than that of the FM luminance signal. For example, any known circuit which can maintain the level of the low frequency band color signal constant in the burst period can be used as this chrominance AGC circuit 15. The output signal of the chrominance AGC circuit 15 is applied to the mixer circuit 5 to be mixed with the FM luminance signal. The output signal of the mixer circuit 5 is applied to the variable gain amplifier circuit 16 to be amplified according to the gain provided by a gain control signal d applied from the signal detector circuit 23 or 24 through the switching circuit 25. The output signal from the variable gain amplifier circuit 16 is applied to the rotary magnetic heads 9 and 10 through the recording amplifier circuit 8 and the rotary transformer 11 to be recorded on a magnetic recording medium (not shown).

The recording currents supplied to the rotary magnetic heads 9 and 10 are detected by the respective resistors 13 and 14 and supplied to the respective synchronizing signal period level detector circuits 17 and 18, to each of which a synchronizing signal e is applied from the input terminal 27. These synchronizing signal period level detector circuits 17 and 18 detect the levels of the recording currents in the synchronizing period of the video signal being recorded. As is commonly known, the down converted chrominance signal having an amplitude modulation variation is not present in the synchronizing period of the video signal being recorded, and only the FM luminance signal whose amplitude should primarily be constant is present in the synchronizing period. Therefore, when the levels of the recording currents in the synchronizing period are extracted and detected by these detector circuits 17 and 18, respectively, variations of the recording current levels due to the gain in the recording circuit system or due to a difference between the inductances of the rotary magnetic heads 9 and 10 can be detected.

The detection outputs from the detector circuits 17 and 18 are applied to the comparator circuits 19 and 20 where the levels of these detection outputs are compared with those of reference voltages supplied from the reference voltage sources 21 and 22, respectively. The comparison error outputs from the comparator circuits 19 and 20 are detected and rectified by the signal detector circuits 23 and 24, respectively, and the detection outputs from the signal detector circuits 23 and 24 are applied to the switching circuit 25. A head switching signal f is applied from the input terminal 26 to the switching circuit 25, so that the rotary magnetic heads 9 and 10 are switched over for alternately scanning the magnetic recording medium. The detection outputs from the signal detector circuits 23 and 24 are alternately applied to the variable gain amplifier circuit 16 as the gain control signal d so as to control the gain.

Thus, the levels of the recording currents supplied to the rotary magnetic heads 9 and 10 are independently controlled in a time division mode. Therefore, when the control gains (the resistance values of the resistors 13 and 14, etc.) in the individual control systems are selected to be equal, and both the reference voltages supplied from the reference voltage sources 21 and 22 are set at a voltage value corresponding to the value of the rated recording current to be supplied to the rotary magnetic heads 9 and 10, the values of the recording currents supplied to the respective rotary magnetic heads 9 and 10 can be automatically controlled to be equal to the rated recording current value regardless of, for example, fluctuation of the inductances of the rotary magnetic heads 9 and 10.

Figure 4:
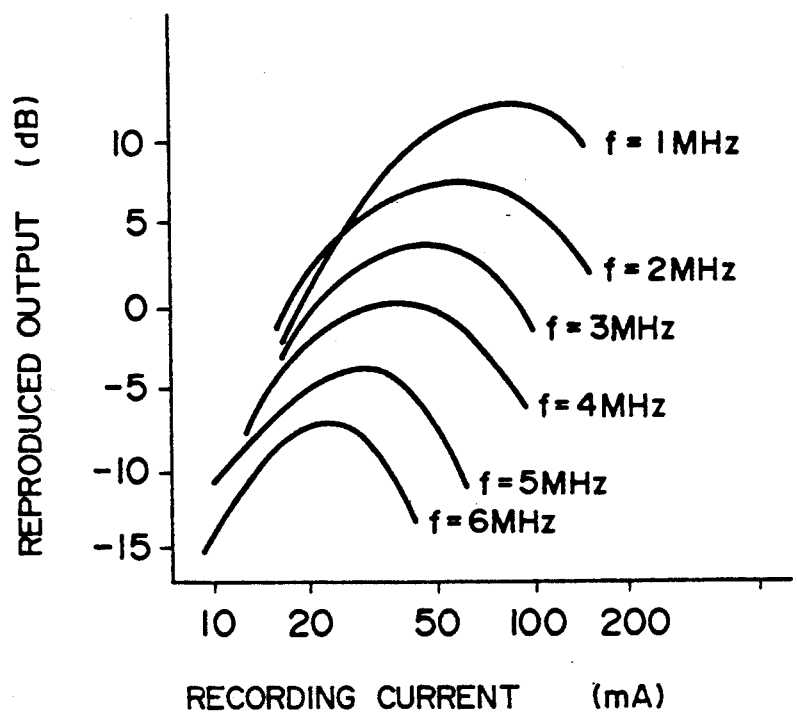
FIG. 4 is a graph showing the relation between a recording current and a reproduced output in a magnetic recording and reproducing apparatus of this kind.

The rated recording current value described above is a recording current value which maximizes the level of a reproduced FM luminance signal as described already. Strictly speaking, because the recording and reproducing characteristic curves themselves shown in FIG. 4 tend to shift toward the left or the right due to fluctuation of the inductances of the rotary magnetic heads 9 and 10, the level of the FM luminance signal reproduced by each of the rotary magnetic heads 9 and 10 cannot be maximized even when the same rated recording current is supplied to each of the rotary magnetic heads 9 and 10. However, because the error between the reproduced levels is usually so slight that the manner of control for supplying the same rated recording current to each of the rotary magnetic heads 9 and 10 can sufficiently practically satisfy the requirement. Of course, by suitably regulating the reference voltages supplied from the reference voltage sources 21 and 22 as required, the value of the recording current supplied to each of the rotary magnetic heads 9 and 10 can be controlled.

In the manner described above, the recording current supplied to each of the rotary magnetic heads 9 and 10 is automatically controlled so that the output level of the FM luminance signal reproduced by each of the rotary magnetic heads 9 and 10 can be substantially maximized. In conjunction with the above manner of controlling the level of the reproduced FM luminance signal, the level of the down converted chrominance signal mixed with the FM luminance signal in the mixer circuit 5 is similarly controlled in the variable gain amplifier circuit 16, so that the ratio between the level of the FM luminance signal and that of the down converted chrominance signal is always maintained constant. Thus, when the level of the low frequency band color signal is previously set by the chrominance AGC circuit 15 to be maintained at a predetermined value lower by 10 dB or less than the level of the FM luminance signal as described already, the recording current level for the down converted chrominance signal can also be freed from any adjustment.

In the embodiment described above, the synchronizing signal period level detector circuits 17 and 18 are provided so as to extract the FM luminance signal recording currents only from the recording currents detected by the respective resistors 13 and 14. However, in lieu of the synchronizing signal period level detector circuits 17 and 18, high-pass filters may be provided so as to extract the FM luminance signal only. Also, the synchronizing signal period level detector circuits 17 and 18 may be combined with high-pass filters so as to remove a noise component such as the down converted chrominance signal mixed in the synchronizing period, so that only the FM luminance signal present in the synchronizing period can be reliably extracted.

Figure 2:
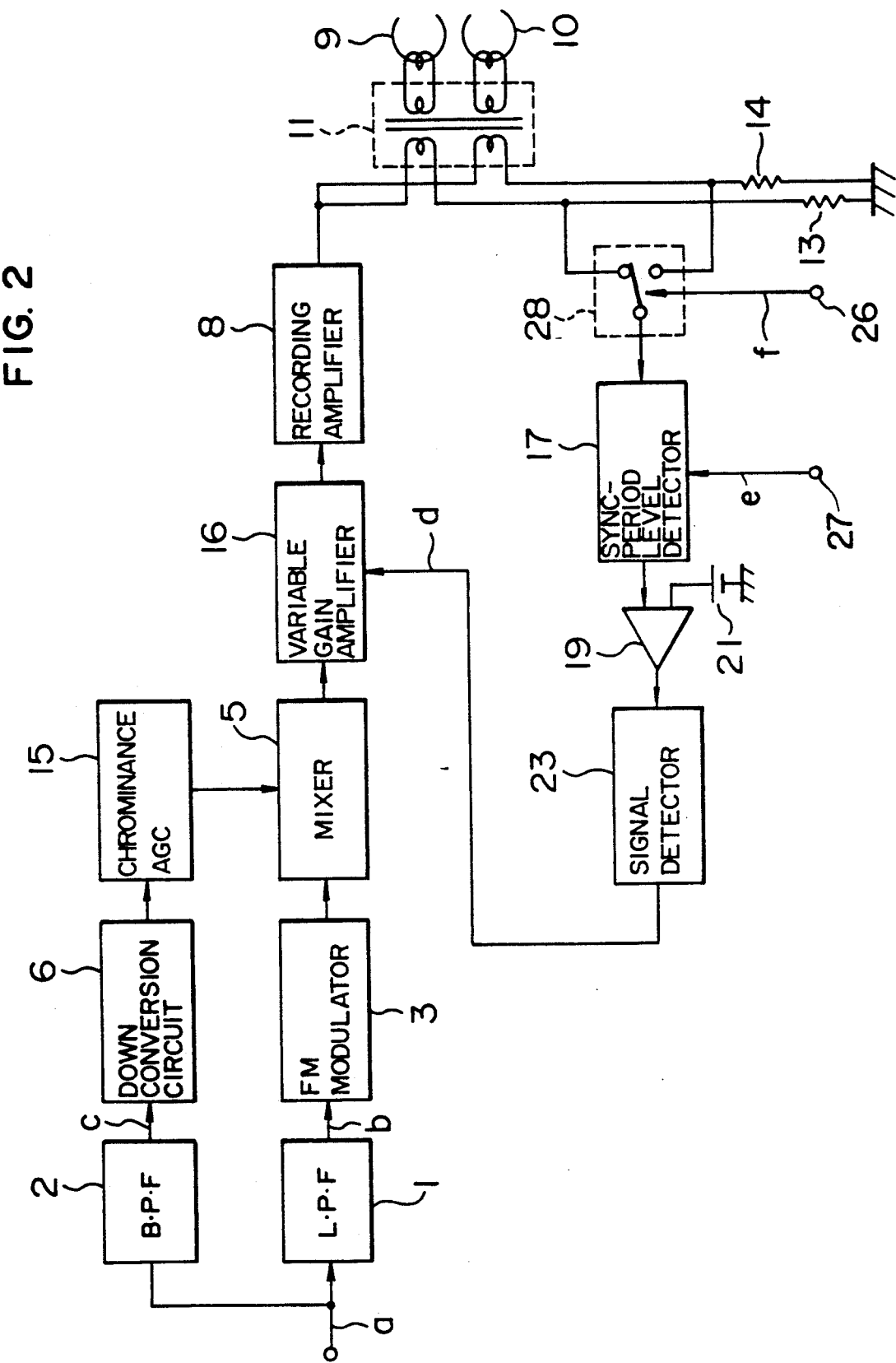
FIG. 2 is a block circuit diagram showing the structure of another embodiment of the magnetic recording and reproducing apparatus according to the present invention.

FIG. 2 shows the structure of another embodiment of the magnetic recording and reproducing apparatus according to the present invention, and, in FIG. 2, the same reference numerals and symbols are used to designate the same parts and signals appearing in FIG. 1.

In this second embodiment, the structure of the first embodiment shown in FIG. 1 is simplified so that the recording currents supplied to the rotary magnetic heads 9 and 10 can be controlled by a single control circuit system. That is, in the recording current control circuit systems for the respective rotary magnetic heads 9 and 10 in FIG. 1, the synchronizing signal period level detector circuit 18, the comparator circuit 20, the reference voltage source 22 and the signal detector circuit 24 constituting one of the recording current control circuit systems is eliminated, and a switching circuit 28 is provided in lieu of the switching circuit 25, so that the outputs of the resistors 13 and 14 detecting the recording currents supplied to the respective rotary magnetic heads 9 and 10 are alternately supplied to the synchronizing signal period level detector circuit 17 through the switching circuit 28.

As in the case of the switching circuit 25 shown in FIG. 1, the switching circuit 28 is switched over in each of the periods in which the rotary magnetic heads 9 and 10 alternately scan the magnetic recording medium in response to the head switching signal f applied from the input terminal 26. It will be apparent that, in this second embodiment, too, the recording currents supplied to the rotary magnetic heads 9 and 10 are controlled in a time division mode as in the case of the first embodiment.

In this second embodiment, the control error voltage applied to the signal detector circuit 23 changes stepwise according to the inductance values of the rotary magnetic heads 9 and 10 whenever the switching circuit 28 is switched over. Therefore, it is necessary to set the smoothing time constant of the signal detector circuit 23 at a relatively small value. However, the value of this smoothing time constant cannot be made small without limitation. Thus, there arises the problem that the output of the signal detector circuit 23 cannot completely follow the stepwise change of the control error voltage. On the other hand, in the case of the first embodiment shown in FIG. 1, such a problem does not arise because such a stepwise change of the control error voltage does not occur.

The above description has referred to specific embodiments in which the present invention is applied to a VHS system VTR. However, it is apparent that the present invention is in no way limited to such specific embodiments and is generally applicable to a magnetic recording and reproducing apparatus in which an input signal is sequentially recorded on a magnetic recording medium by a plurality of rotary magnetic heads. Further, in order to detect an error of the recording current level, an FM signal (an FM luminance signal) need not necessarily be included in a signal to be recorded unlike the aforementioned embodiments, and an essential requirement is only such that the signal to be recorded includes a signal which is not subjected to any amplitude variation in itself. Therefore, a signal such as a pilot signal having a constant amplitude may be mixed in the signal to be recorded so as to detect an error of the recording current level by detecting its amplitude variation error.

It will be understood from the foregoing detailed description of the magnetic recording and reproducing apparatus according to the present invention that recording currents to be supplied to a plurality of rotary magnetic heads for recording an input signal on a magnetic recording medium are controlled in a time division mode, so that the recording currents supplied to the respective rotary magnetic heads can be independently controlled, and so that any error of the recording current levels due to fluctuation of the inductances of the rotary magnetic heads can be removed. Further, regardless of fluctuation of the input level of the signal to be recorded or regardless of fluctuation of the gain in the recording circuit system, the level of the recording current supplied to each of the rotary magnetic heads can be always automatically controlled to the predetermined value without resorting to manual adjustment. Therefore, according to the present invention, variable resistors for the manual adjustment purpose required in the prior art apparatus need not be provided in the recording circuit system, and the entire recording circuit system can be integrated into an IC, so that the circuit parts cost can be decreased, and the manufacturing process can also be simplified.

We claim:

1. A magnetic recording and reproducing apparatus for sequentially recording an input signal on a magnetic recording medium by a plurality of rotary magnetic heads, said apparatus comprising:

variable gain amplifier means for variably controlling amplitudes of respective recording currents supplied to said rotary magnetic heads; and control means for detecting amplitude variations of the respective recording currents supplied to said rotary magnetic heads and sequentially variably controlling a gain of said variable gain amplifier means on the basis of the detected amplitude variations in respective scanning periods in which said rotary magnetic heads sequentially and alternately scan said magnetic recording medium.

2. A magnetic recording and reproducing apparatus according to claim 1, wherein said control means includes:

a plurality of recording current amplitude variation detecting means for detecting respective amplitude variations of the respective recording currents supplied to said rotary magnetic heads; and switching means for sequentially and selectively applying respective outputs of said recording current amplitude variation detecting means to said variable gain amplifier means in timed relation with the respective scanning periods in which said rotary heads scan said magnetic recording medium.

3. A magnetic recording and reproducing apparatus according to claim 2, wherein said plurality of recording current amplitude variation detecting means include:

a plurality of current detector elements for detecting the respective recording currents supplied to said rotary magnetic heads;

a plurality of level change detecting means for detecting respective level changes of said respective recording currents detected by said current detector elements;

a plurality of level comparing means for comparing respective levels of said respective recording currents detected by said level change detecting means with respective reference voltage levels; and a plurality of signal detecting means for rectifying respective output signals of said level comparing means;

wherein said switching means sequentially and selectively applies said rectified output signals to said variable gain amplifier means.

4. A magnetic recording and reproducing apparatus according to claim 3, wherein said input signal to be recorded by said rotary magnetic heads on said magnetic recording medium is a video signal having a synchronizing period, and wherein said level change detecting means are synchronizing period level detecting means for detecting respective levels of said respective recording currents in the synchronizing period of said video signal.

5. A magnetic recording and reproducing apparatus according to claim 1, wherein said control means includes:

a plurality of recording current detecting means for detecting the respective recording currents supplied to said rotary magnetic heads;

switching means for sequentially selecting respective outputs of said recording current detecting means in timed relation with the respective scanning periods in which said rotary heads scan said magnetic recording medium; and recording current amplitude variation detecting means for sequentially detecting amplitude variations of the respective recording currents supplied to said rotary magnetic heads by detecting an output of said switching means and supplying said detected amplitude variations to said variable gain amplifier means.

6. A magnetic recording and reproducing apparatus according to claim 5, wherein said input signal to be recorded on said magnetic recording medium by said plural rotary magnetic heads is a video signal having a synchronizing period, and wherein said amplitude variation detecting means includes:

synchronizing period level detecting means for detecting levels of the respective recording currents in the synchronizing period of said video signal;

level comparing means for comparing said recording current levels detected by said synchronizing period level detecting means with a reference voltage level; and signal detecting means for rectifying an output signal of said level comparing means and supplying said rectified output signal to said variable gain amplifier means.

* * * * *